United States Patent
Eguchi

(10) Patent No.: US 8,973,307 B2
(45) Date of Patent: Mar. 10, 2015

(54) DOOR WEATHER STRIP HAVING UPPER EXTRUSION MOLDED PART, MOLDED PART, AND LOWER EXTRUSION MOLDED PART

(71) Applicant: Nishikawa Rubber Co., Ltd., Hiroshima-shi, Hiroshima-ken (JP)

(72) Inventor: Tomofumi Eguchi, Hiroshima (JP)

(73) Assignee: Nishikawa Rubber Co., Ltd., Hiroshima-shi (JP)

(*) Notice: Subject to any disclaimer, the term of this patent is extended or adjusted under 35 U.S.C. 154(b) by 0 days.

(21) Appl. No.: 13/958,856

(22) Filed: Aug. 5, 2013

(65) Prior Publication Data
US 2014/0059940 A1 Mar. 6, 2014

(30) Foreign Application Priority Data

Aug. 29, 2012 (JP) ................................. 2012-189096
Jul. 26, 2013 (JP) ................................. 2013-155179

(51) Int. Cl.
*B60J 10/00* (2006.01)
*B60J 10/08* (2006.01)

(52) U.S. Cl.
CPC .......... *B60J 10/0017* (2013.01); *B60J 10/0031* (2013.01); *B60J 10/085* (2013.01); *B60J 10/083* (2013.01); *B60J 10/086* (2013.01)
USPC ....... 49/476.1; 49/475.1; 49/479.1; 49/489.1; 49/498.1

(58) Field of Classification Search
USPC ............. 49/475.1, 476.1, 479.1, 489.1, 498.1
See application file for complete search history.

(56) References Cited

U.S. PATENT DOCUMENTS

| | | | | | |
|---|---|---|---|---|---|
| 2,794,221 | A | * | 6/1957 | Bedics | 49/479.1 |
| 4,928,431 | A | * | 5/1990 | Kuzuhara et al. | 49/479.1 |
| 5,209,546 | A | * | 5/1993 | Hasegawa et al. | 296/213 |
| 5,636,895 | A | * | 6/1997 | Ito et al. | 296/146.9 |
| 5,655,333 | A | * | 8/1997 | Yamashita | 49/441 |
| 6,237,287 | B1 | * | 5/2001 | Nakagawa et al. | 49/479.1 |
| 6,386,619 | B1 | * | 5/2002 | Tsuchida | 296/146.9 |
| 6,405,489 | B1 | * | 6/2002 | Miura | 49/479.1 |
| 6,536,834 | B2 | * | 3/2003 | Yamashita et al. | 296/146.9 |
| 6,964,133 | B2 | * | 11/2005 | Aritake et al. | 49/479.1 |
| 7,197,850 | B2 | * | 4/2007 | Mizutani et al. | 49/498.1 |
| 8,479,450 | B2 | * | 7/2013 | Mori et al. | 49/476.1 |
| 2005/0050800 | A1 | * | 3/2005 | Ueda et al. | 49/479.1 |

FOREIGN PATENT DOCUMENTS

JP 2008-254562 A 10/2008

\* cited by examiner

*Primary Examiner* — Katherine Mitchell
*Assistant Examiner* — Marcus Menezes
(74) *Attorney, Agent, or Firm* — Lucas & Mercanti LLP; Robert P. Michal

(57) ABSTRACT

A door weather strip includes an upper extrusion molded part installed on a door sash on a roof side; a molded part without a slit thereon, connected to the upper extrusion molded part on a door corner part; and a lower extrusion molded part installed on a vertical part of the door sash and detachably inserted into the molded part; the upper and lower extrusion molded parts and the molded part having a base bottom part and a hollow seal member formed thereon, in which: a seal bead is formed on the molded part, the seal bead extending from an inner-cabin side toward an outer-cabin side relative to the base bottom part of the molded part on the roof side and descending along an outer-cabin side of a part of the molded part on the vertical part side of the door sash.

16 Claims, 12 Drawing Sheets

DOOR WEATHER STRIP HAVING UPPER EXTRUSION MOLDED PART, MOLDED PART, AND LOWER EXTRUSION MOLDED PART

This application claims the benefit under 35 USC 119 of JP Patent Applications JP 2012-189096 filed Aug. 29, 2012 and JP 2013-155179 filed Jul. 26, 2013, the entire disclosure of which is incorporated herein by reference.

BACKGROUND OF THE INVENTION

The present invention relates to door weather strips installed on door sashes or door panels of automobile doors for sealing outside and inside of the automobiles by making elastic contact with door opening circumferential edges on body sides when the doors are closed.

As shown in FIG. 7, a door weather strip 6 has been installed on an outer circumferential side of door sashes 3, 4 for sealing spaces between the door sashes 3, 4 and a body (body panel 100) when the doors 1,2 are closed.

As shown in FIG. 8 and FIG. 9, the door weather strip 6 on a front door 1 side, for example, is formed by connecting an upper extrusion molded part 7 installed along an upper part of a door sash 3 (may be a part of a door panel) on a roof side (facing the roof) of an automobile and a lower extrusion molded part 8 installed along a vertical part of a door sash 3 on a center pillar side (facing the center pillar) extending in a vertical direction by molding on a corner part 130 to which the extrusion molded parts 7, 8 are connected. A shaded part in FIG. 8 shows a molded part 9 which connects the upper extrusion molded part 7 and the lower extrusion molded part 8 by molding. In FIG. 9, black sides of two black and white triangles define the molded part 9 and white sides define the extrusion molded part (the upper extrusion molded part 7 and the lower extrusion molded part 8).

The upper extrusion molded part 7, the molded part 9 and the lower extrusion molded part 8 respectively have a base bottom part 11 and a hollow seal member 12 formed thereon as shown in FIG. 10.

The hollow seal member 12 functions as a main seal for sealing outside and inside of the automobile by making elastic contact with a door opening circumferential edge of the body panel 100 when the door is closed. In addition, a sub seal 13 as a supplementary seal to the hollow seal member 12 is formed on an outer-cabin side of the hollow seal member 12, which is on an outer side of the base bottom part 11, for making elastic contact with the door opening circumferential edge of the body panel 100.

The molded part 9 comprises a fin 14 which is installed on the door sash 3 via a clip.

When manufacturing the molded part 9 of the door weather strip 6, use of a core (not shown) is inevitable. Accordingly, a slit 15 has to be formed on the base bottom part 11 of the molded part 9 for pulling out the core. In some cases, the slit 15 also has to be formed on the extrusion molded parts 7, 8.

But the slit 15 causes seal leak, which hampers a structure of draining water on the molded part 9 toward the outer-cabin side by providing a seal bead in a manner to cross the slit 15 from an inner-cabin side over an outer-cabin side. This is because the seal bead crossing the slit 15 the inner-cabin side over the outer-cabin side may be subjected to the seal lack on a part which is cut off by the slit 15. As an alternative, the seal bead 15 may also be formed to be consecutive by providing two seal beads which approach the slit 15 respectively from the inner-cabin side and the outer-cabin side and then partially adhering the slit 15. But, according to the structure, it is technically hard to shove both end surfaces with each other precisely and excellently in appearance. Also, number of processes increases and an extra fee arises for use of adhesive. In this connection, as an example, foamed sealing material including "EPTSEALER (registered trademark)" of NITTO DENKO CORPORATION may be separately provided on the molded part 9 in a finish work. In this case, since the foamed sealing material is manually adhered, there have remained problems that a position on which the foamed sealing material is adhered easily varies, thereby degrading sealing property and manufacturing cost rises.

In addition, as shown in FIG. 11, the slit 15 has caused problems that, when the hollow seal member 12 and the sub seal 13 of the molded part 9 make elastic contact with the body panel 100, a connecting part between the hollow seal member 12 and the sub seal 13 or a top end of the sub seal 13 falls in toward the base bottom part 11 side or the hollow seal member 12 gets into the inner-cabin side. Such a structure degrades the sealing property and external appearance.

In this connection, there has been proposed a structure of removably inserting one end of the extrusion molded part into the molded part for preventing twist at the time of installation (see, for example, Japanese unexamined Patent Publication No. 2008-254562). But the Japanese unexamined Patent Publication No. 2008-254562 does not teach a structure on an installation surface side of the molded part relative to the door sash or disclose a manner of providing the seal bead for improving sealing function.

Therefore, an object of the present invention is to provide door weather strips capable of performing an excellent water proof function without forming the slits on the molded parts.

SUMMARY OF THE INVENTION

In order to achieve the above-mentioned object, according to one aspect of the invention a door weather strip (6) is provided, comprising: an upper extrusion molded part (7) installed along an upper part of a door sash (3) or a door panel on a roof side of an automobile; a molded part (9) connected to an end of the upper extrusion molded part (7) on a door corner part (130); and a lower extrusion molded part (8) installed along a vertical part of the door sash (3) or the door panel, an upper end of the lower extrusion molded part (8) being detachably inserted into the molded part (9); said upper extrusion molded part (7), said molded part (9) and said lower extrusion molded part (8) having a base bottom part (11) and a hollow seal member (12) formed thereon, the hollow seal member (12) being integrally molded with the base bottom part (11) and making elastic contact with a door opening circumferential edge on a body side when a door (1) is closed, wherein:

a seal bead (30) or a lip is integrally molded with the molded part (9) without being broken off because of a slit for pulling out a core for molding, said seal bead (30) or said lip continuously extending from an inner-cabin side toward an outer-cabin side relative to the base bottom part (11) of said molded part (9) on said roof side and descending along an outer-cabin side of a part of said molded part (9) on the vertical part side of said door sash (3) or said door panel.

The slit may be provided on a surface extending from a corner of the base bottom part (11) of said molded part (9) toward said lower extrusion molded part (8) side or only on a surface of said lower extrusion molded part (8) side of said molded part (9). Also, the slit for pulling out the core for molding is not necessarily formed on said molded part (9).

In addition, according to an aspect of the present invention, in the part of said molded part (9) on the vertical part side of said door sash (3) or said door panel, said seal bead (30) or said lip is on an outer circumferential side compared with said lower extrusion molded part (8) inserted into said molded part (9).

In addition, according to an aspect of the present invention, said seal bead (30) or said lip continuously extends to a lower end of said molded part (9).

In addition, according to an aspect of the present invention, length (150) of said molded part (9) extending from a corner toward said lower extrusion molded part (8) side is longer than length (140) of said molded part (9) extending from said corner toward said upper extrusion molded part (7) side.

In addition, according to an aspect of the present invention, a bridge (31) is provided between the hollow seal member (12) and the base bottom part (11) of said molded part (9).

The above claims employ wordings "door sash (3) or door panel" because a window frame may be called "door panel" as a part of a door panel as well as "door sash".

Symbols in parentheses show constituents or items corresponding to the drawings.

According to the present invention, the lower extrusion molded part installed along the vertical part of the door sash or the door panel is detachably inserted into the molded part connected to the end of the upper extrusion molded part installed along the roof side of the door sash or the door panel of the automobile. Accordingly, the seal bead or the lip continuously extends from the inner-cabin side toward the outer-cabin side of the base bottom part of the molded part and descends along the outer-cabin side of the part of the molded part on the vertical part side of said door sash or the door panel, while the seal bead or the lip is not broken off because of the slit even in case the slit for pulling out the core for molding is formed on the base bottom part of the molded part or because the slit for pulling out the core for molding is not formed on the base bottom part of the molded part. As a result, the seal bead or the lip continuously extends without being cut off. Such a structure guides water entering an inner circumferential side of the door from the outer circumferential side downward along the outer circumferential side of the seal bead or the lip and prevents entrance of water toward the inner-cabin side, thereby performing an excellent water proof function. Also, the structure ensures sealing property between the door weather strip and the door sash or the door panel without using a separate sub-material such as a foamed sealing material surfaced with an adhesive tape, thereby lowering manufacturing cost. Also, since a manufacturing process of manually adhering the foamed sealing material is not necessary, sealing property hardly varies and time required for manufacturing is shortened.

In case the slit is not formed on the base bottom part of the molded part, the process of partially adhering the slit or use of adhesive according to the prior art becomes unnecessary. Also, since the core can be pulled out from the end of the molded part, the bridge can be provided inside the molded part.

In addition, the structure without the slit stabilizes shape of the base bottom part of the molded part and prevents the hollow seal member of the molded part from getting into the inner-cabin side or partially falling in toward the base bottom part side when the hollow seal member makes elastic contact with the body side as in the prior art (FIG. 11).

In addition, according to the present invention, in the part of the molded part on the vertical part side of the door sash or the door panel, the seal bead or the lip is on the outer circumferential side compared with the lower extrusion molded part inserted into the molded part. Such a structure prevents entrance of water toward the lower extrusion molded part side from the outer circumferential side of the molded part.

In addition, according to the present invention, since the seal bead or the lip continuously extends to the lower end of the molded part, water which falls down along the seal bead or the lip is drained outside the automobile without fail.

In addition, according to the present invention, the length of the molded part extending from the corner toward the lower extrusion molded part side is longer than the length of the molded part extending from the corner toward the upper extrusion molded part side. Accordingly, even in case the slit is not formed on the base bottom part, the core for molding can be pulled out smoothly and easily. According to the structure, the lower extrusion molded part connected to the molded part by the insertion is laid on a large area of the molded part, thereby increasing lap amount and the lower extrusion molded part is stably held.

In addition, according to the present invention, the bridge is provided between the hollow seal member and the base bottom part of the molded part. Such a structure further prevents the hollow seal member of the molded part from getting into the inner-cabin side or partially falling in toward the base bottom part side when the hollow seal member of the molded part makes elastic contact with the body side as in the prior art (FIG. 11).

DESCRIPTION OF PREFERRED EMBODIMENT

Referring to FIG. 1 to FIG. 5, FIG. 7 and FIG. 8, a door weather strip according to an embodiment of the present invention will be described. When constituents or items correspond to those in prior arts, the same symbols are used.

Figure 1:
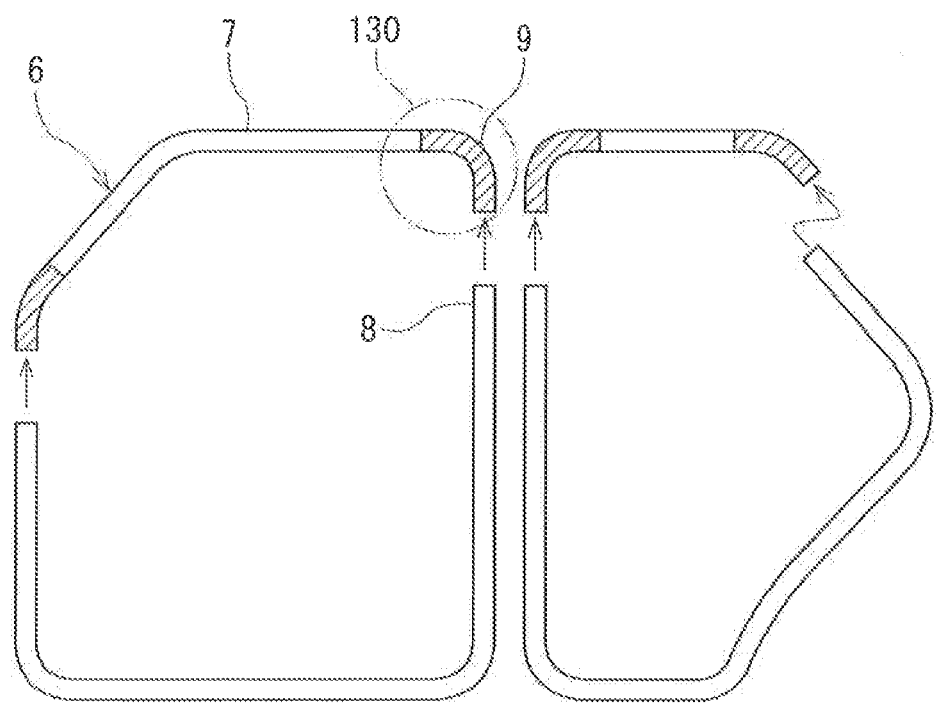
FIG. 1 is an enlarged side view of door weather strips according to an embodiment of the present invention, showing a state that the door weather strips are divided.
Figure 8:
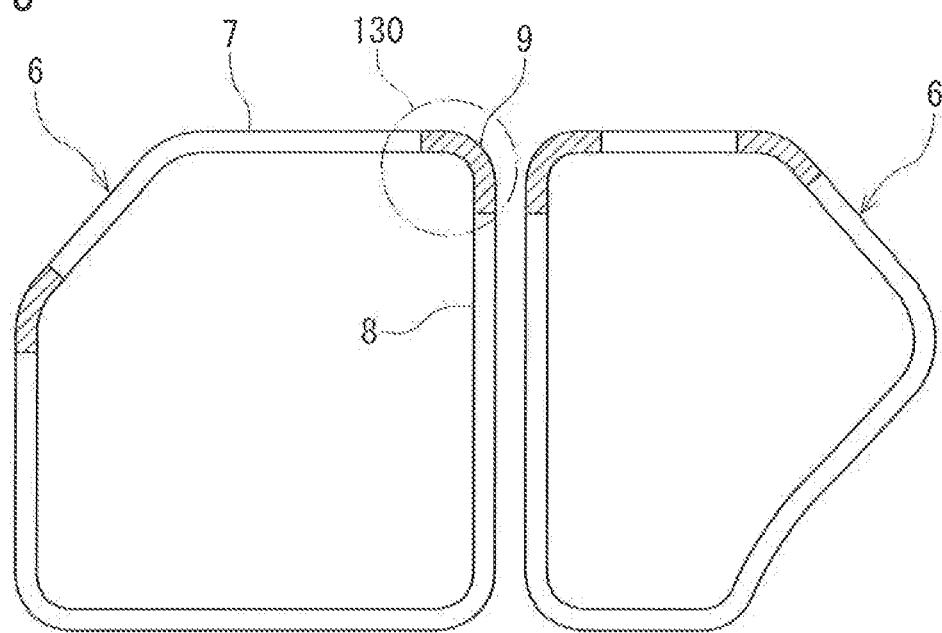
FIG. 8 is an enlarged side view of door weather strips of FIG. 7.
Figure 9:
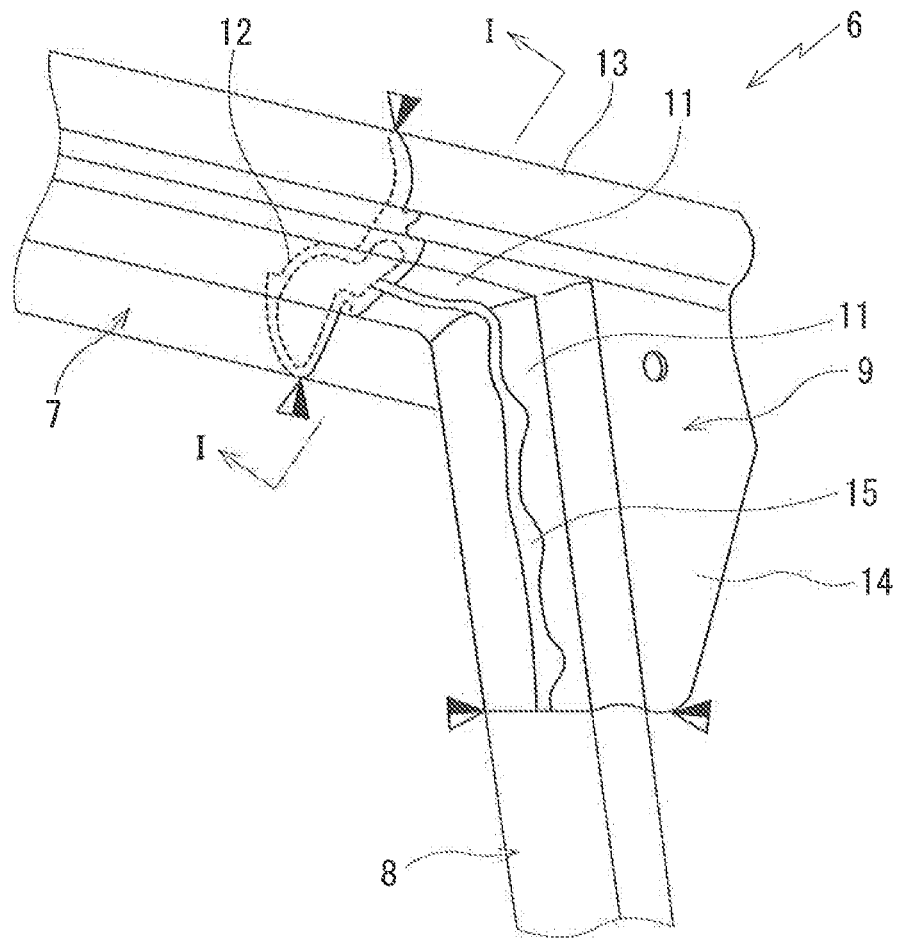
FIG. 9 is an enlarged perspective view of the part 130 of FIG. 8 of a door weather strip according to a prior art.
Figure 10:
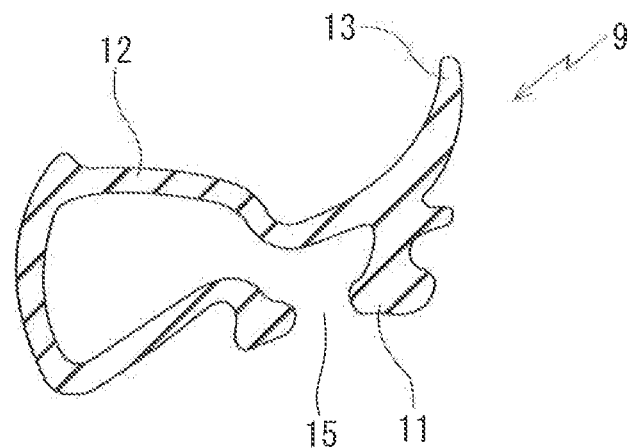
FIG. 10 is a I-I line enlarged cross section of FIG. 9.

As shown in FIG. 1, a door weather strip 6 according to the embodiment of the present invention is a divisible door weather strip. According to the door weather strip 6, an upper end of a molded part 9 is connected to an end of an upper extrusion molded part 7 on a door corner part 130 and an upper end of a lower extrusion molded part 8 is detachably inserted into the molded part 9. FIG. 1 shows a state before the lower extrusion molded part 8 is inserted. As the upper end of the lower extrusion molded part 8 is inserted into the molded part 9, an annular door weather strip shown in FIG. 8 is formed.

The upper extrusion molded part 7 is installed along an upper part of a door sash 3 (may be called a part of a door panel) on a roof side (relative to the roof) of an automobile. The lower extrusion molded part 8 is installed along a vertical part of the door sash 3 on a center pillar side (facing the center pillar) extending in a vertical direction.

Figure 2:
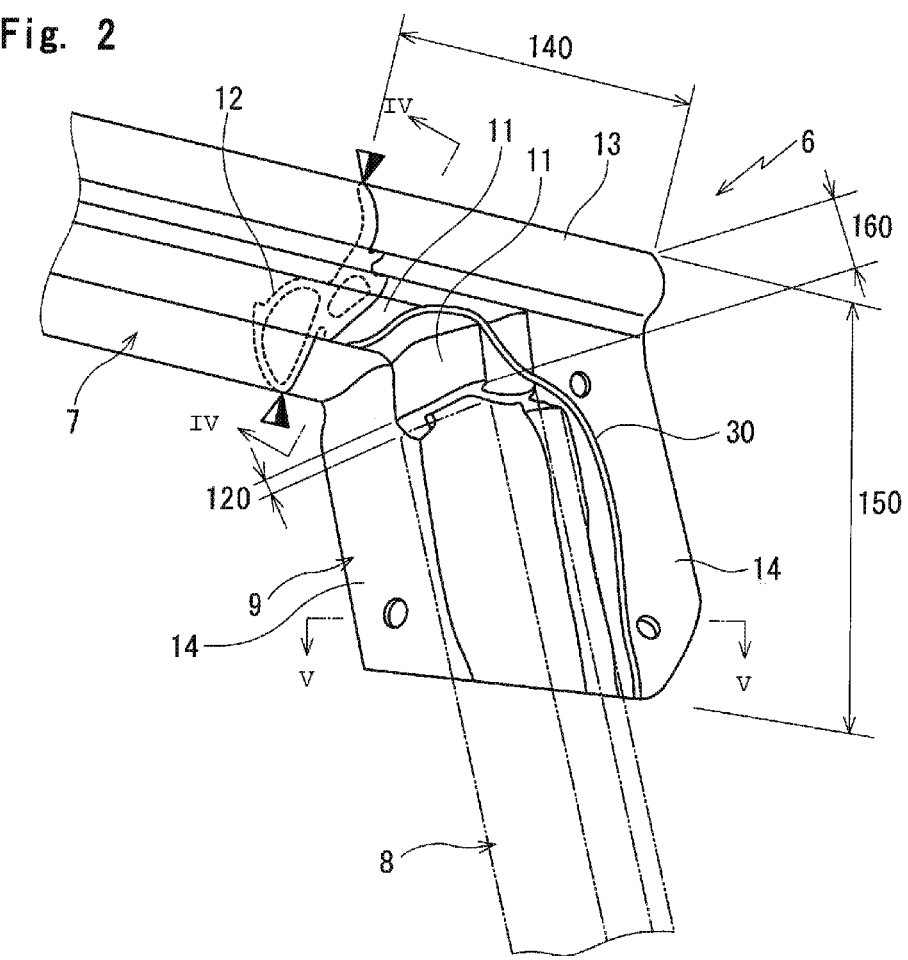
FIG. 2 is an enlarged perspective view of a part 130 of FIG. 8 of the door weather strip according to the embodiment of the present invention.
Figure 5:
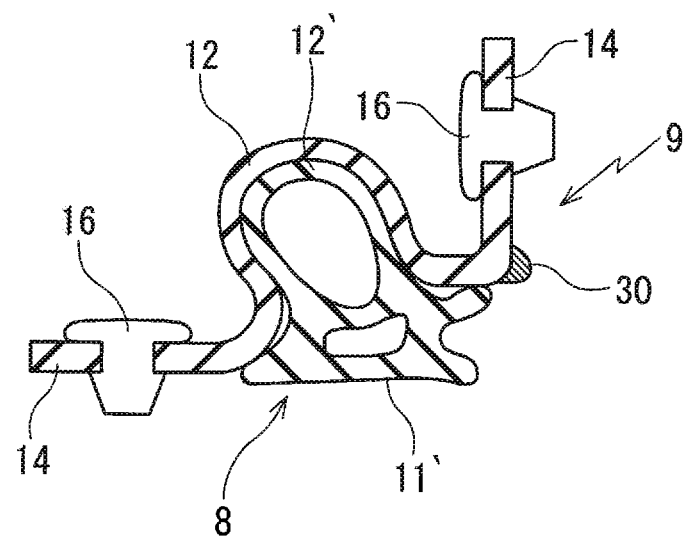
FIG. 5 is a V-V line enlarged cross section of FIG. 2.

As shown in FIG. 2, the upper end of the lower extrusion molded part 8 is inserted into a hollow seal member 12 on the molded part 9 side while being spaced out toward a lower side from a lower end of a base bottom part 11 formed on a corner of the molded part 9 by a little space 120. As shown in FIG. 5, the hollow seal member 12 on the molded part 9 side is swelled and curved toward an inner-cabin side on a lower side of a lower end of the base bottom part 11 formed on the corner of the molded part 9 and the upper end of the lower extrusion molded part 8 is inserted into a hollow seal member 12. The space 120 enables assembly of the lower extrusion molded part 8 even in case length of the upper end of the lower extrusion molded part 8 varies.

Figure 3:
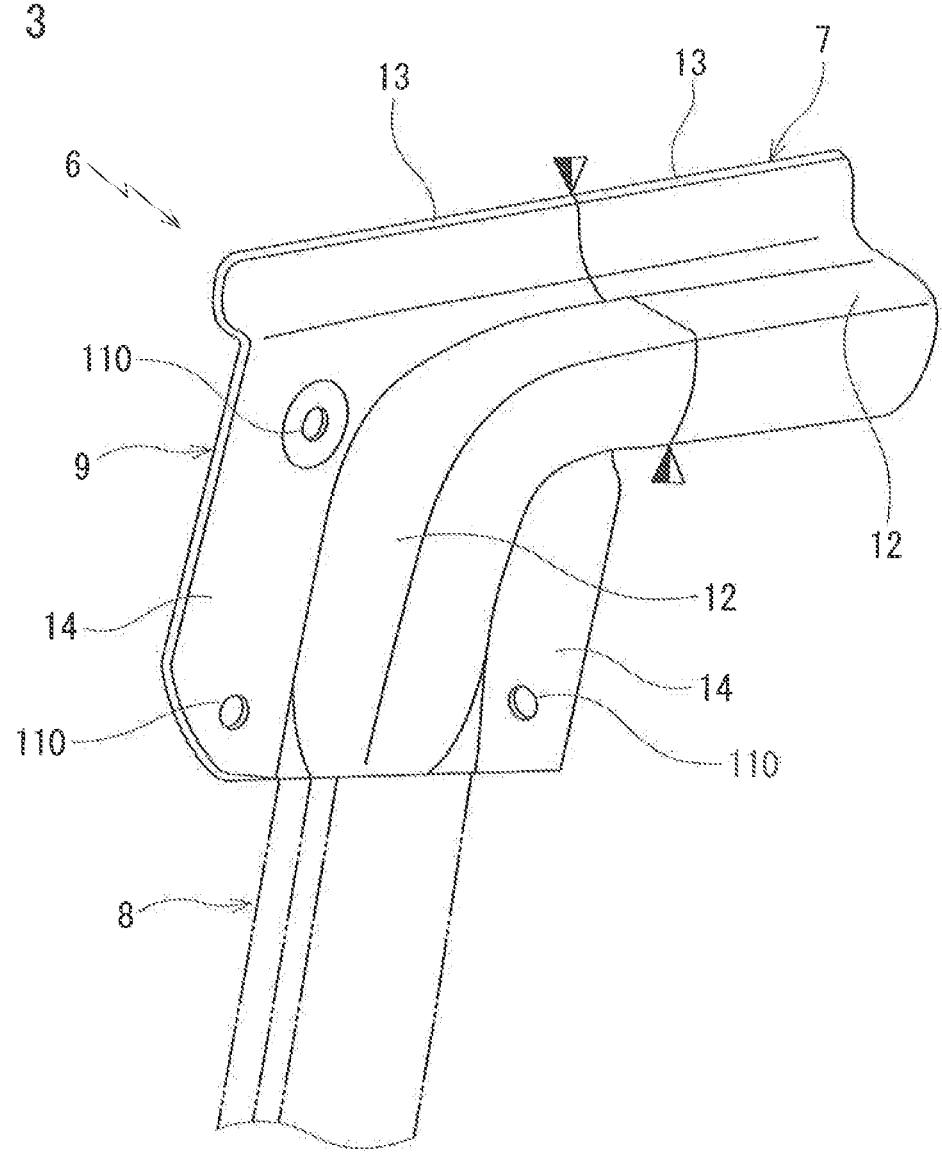
FIG. 3 is an enlarged perspective view of the part 130 of FIG. 8 of the door weather strip according to the embodiment of the present invention, seen from an angle different from FIG. 2.
Figure 4:
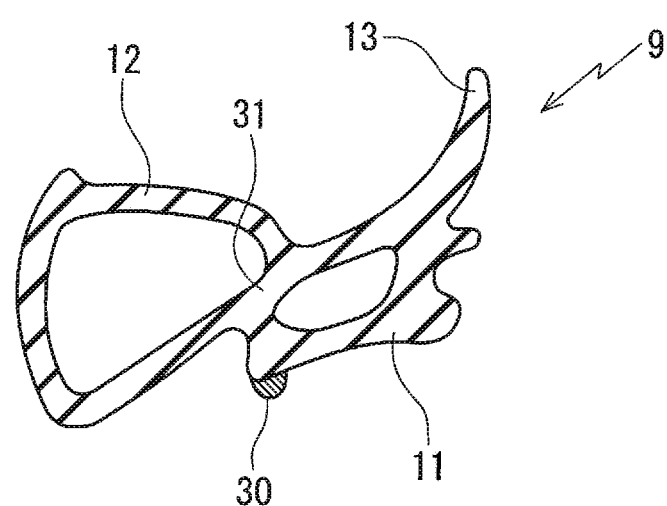
FIG. 4 is a IV-IV line enlarged cross section of FIG. 2.

FIG. 2 is a view seen from an outer-cabin side (installation surface side), showing a state that the door weather strip 6 is installed on the door sash 3. In FIG. 2, the lower extrusion molded part 8 is shown by a two-dotted line. FIG. 3 is a view seen from the inner-cabin side, showing a state that the door weather strip 6 is installed on the door sash 3. FIG. 4 is a IV-IV line enlarged cross section of FIG. 2 and FIG. 5 is a V-V line enlarged cross section of FIG. 2. In FIG. 5, the lower extrusion molded part 8 inserted into the hollow seal member 12 (in FIG. 5, the hollow seal member on an upper side, covering the lower extrusion molded part 8) on the molded part 9 side is shown by a solid line. Also, clips 16 inserted in holes on a fin 14 formed on the molded part 9 for installing the molded part 9 on the door sash 3 are shown by the solid line.

FIG. 2 and FIG. 3 show the upper extrusion molded part 7 and the molded part 9 connected with the upper extrusion molded part 7 by molding. In FIG. 2 and FIG. 3, black sides of two black and white triangles define the molded part 9 and white sides define the extrusion molded part (the upper extrusion molded part 7). The lower extrusion molded part 8 and the molded part 9 are not connected by molding.

The upper extrusion molded part 7 and the molded part 9 comprise a base bottom part 11 and a hollow seal member 12. The lower extrusion molded part 8 comprise a base bottom part 11' and a hollow seal member 12' as shown in FIG. 5. The hollow seal member 12 is integrally molded with the base bottom part 11 and functions as a main seal for sealing outside and inside of the automobile by making elastic contact with a door opening circumferential edge of a body panel 100 when a front door 1 is closed. In addition, a sub seal 13 which functions as a supplementary seal is formed on an outer-cabin side of the hollow seal member 12, which is on an outer side of the base bottom part 11. The sub seal 13 seals the outside and inside of the automobile by making elastic contact with the door opening circumferential edge of the body panel 100.

The upper extrusion molded part 7 and the molded part 9 are connected by molding while ends thereof shove against with each other. In a cross sectional shape shown in FIG. 4, the base bottom part 11, the hollow seal member 12 and the sub seal 13 are sequentially and integrally molded. Also, in the same manner as the cross sectional shape of the upper extrusion molded part 7, a bridge 31 is provided between the hollow seal member 12 and the base bottom part 11 of the molded part 9. The bridge 31 connects one connecting part between the hollow seal member 12 and the sub seal 13 and another connecting part on an inner-cabin side between the hollow seal member 12 and the base bottom part 11.

The molded part 9 has substantially the same cross sectional shape as FIG. 4 in a range from the corner to an end on the upper extrusion molded part 7 side and in a range from the corner to a lower side position descended by a little distance 160. A slit for pulling out a core for molding is not formed on the base bottom part 11 having a substantially plate-like shape.

On a part lower than the distance 160, the base bottom part 11 is not formed and, as the cross sectional shape of FIG. 5, the hollow seal member 12 forms a bag-like shape in which only the hollow seal member 12 is swelled and curved toward the inner-cabin side. On a bag-like shape part, the base bottom part 11 is cut out and an installation surface side is open.

In addition, length 150 of the molded part 9 extending from the corner toward the lower extrusion molded part 8 side is longer than length 140 of the molded part 9 extending from the corner toward the upper extrusion molded part 7 side.

In addition, as shown in FIG. 2, a seal bead 30 which makes elastic contact with a door sash 3 when the door weather strip 6 is installed is integrally molded with the outer-cabin side (installation surface side) of the molded part 9 simultaneously with the molding.

The seal bead 30 continuously extends from the inner-cabin side toward the outer-cabin side relative to the base bottom part 11 of the molded part 9 on the roof side and descends along an outer-cabin side of a part of the molded part 9 on a vertical part side of the door sash 3. More specifically, the seal bead 30 is continuously formed in a manner to diagonally extend above the base bottom part 11 from the inner-cabin side of a substantial end of the molded part 9 on the upper extrusion molded part 7 side toward the outer-cabin side, which is a direction approaching the corner side of the molded part 9, further extend from the corner of the molded part 9 toward the outer circumferential side along an inner circumferential side of an upper-side clip hole 110, near the upper-side clip hole 110, and descend along the outer-cabin side of a fin 14 of the molded part 9 and further along an inner circumferential side of a lower-side clip hole 110, near the lower-side clip hole 110.

In the part of the molded part 9 on the vertical part side of the door sash 3, the seal bead 30 is on an outer circumferential side compared with the lower extrusion molded part 8 inserted into the molded part 9. In addition, the seal bead 30 continuously extends to a lower end of the molded part 9.

A variety of positions of the seal bead 30 are applicable and are not especially limited. But any position that allows the seal bead 30 to continuously extend in a manner to cross the base bottom part 11 from the inner-cabin side toward the outer-cabin side first on the upper part on the roof side of the molded part 9, and then extend and descend along the outer-cabin side which is on the outer circumferential side of the molded part 9 without a break is applicable.

In addition, the base bottom part of the upper extrusion molded part 7 preferably has a seal bead (not shown) which makes elastic contact with the door sash 3, the seal bead being continuously connected with the seal bead 30 of the upper part on the roof side of the molded part 9 in the connecting part. Such a structure guides water on the upper part on the roof side outside along a door corner part 130.

According to the above-structured door weather strip 6 of the present invention, the lower extrusion molded part 8 is detachably inserted into the molded part 9 connected to the end of the upper extrusion molded part 7 so that the slit for pulling out the core for molding is not formed on the base bottom part 11 of the molded part 9. Accordingly, the seal bead 30 continuously extends from the inner-cabin side toward the outer-cabin side of the base bottom part 11 in a manner to cross the base bottom part 11 and descends along the outer-cabin side of the part of the molded part 9 on the vertical part side of the door sash 3. As a result, the seal bead 30 continuously extends without being cut off because of the slit.

Such a structure guides water entering an inner circumferential side of the door 1 from an outer circumferential side downward along an outer circumferential side of the seal bead 30 and prevents entrance of water toward the inner-cabin side, thereby performing an excellent water proof function.

In addition, in the part of the molded part 9 on the vertical part side of the door sash 3, the seal bead 30 is on the outer circumferential side compared with the lower extrusion molded part 8 inserted into the molded part 9. Such a structure prevents entrance of water toward the lower extrusion molded part 8 side from the outer circumferential side of the molded part 9.

In addition, since the seal bead 30 continuously extends to the lower end of the molded part 9, water which falls down along the seal bead 30 is drained outside the automobile without fail.

In addition, according to the present invention, the length 150 of the molded part 9 extending from the corner toward the lower extrusion molded part 8 side is longer than the length 140 of the molded part 9 extending from the corner toward the upper extrusion molded part 7 side. Accordingly, even in case the slit is not formed on the base bottom part 11, the core for molding can be pulled out smoothly and easily. According to the structure, the lower extrusion molded part 8 is laid on a large area of the molded part 9, thereby increasing lap amount and the lower extrusion molded part 8 is stably held.

Figure 11:
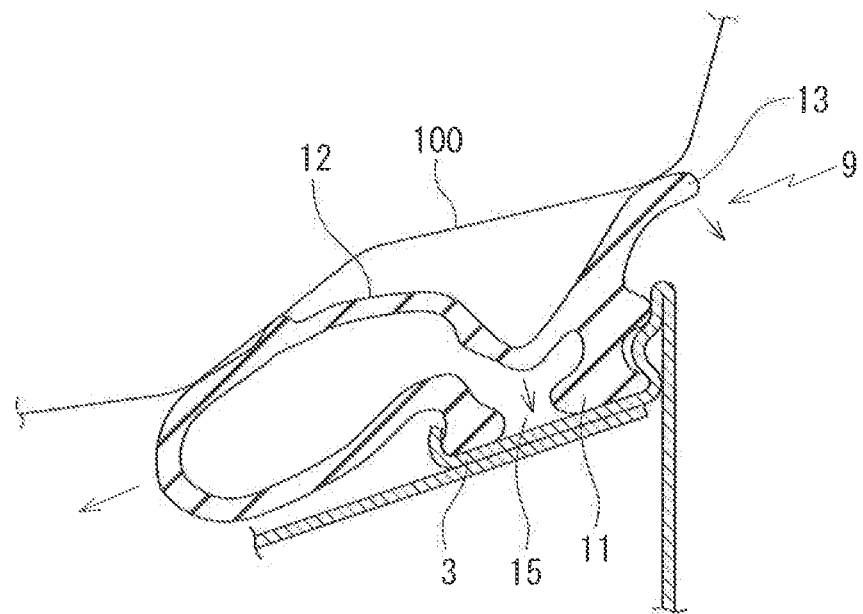
FIG. 11 is a I-I line enlarged cross section of FIG. 9, showing a state that the door weather strip according to the prior art is installed on a door sash and makes elastic contact with a body panel.

In addition, the bridge 31 is provided between the hollow seal member 12 and the base bottom part 11 of the molded part 9. Such a structure further prevents the hollow seal member 12 of the molded part 9 from getting into the inner-cabin side or partially falling in toward the base bottom part 11 side when the hollow seal member 12 of the molded part 9 makes elastic contact with the body panel 100 as in the prior art (FIG. 11).

According to the door weather strip 6 of the present embodiment, the slit for pulling out the core for molding is not formed on the base bottom part 11 of the molded part 9 and the seal bead 30 is formed which extends from the inner-cabin side toward the outer-cabin side of the base bottom part 11 in a manner to cross the base bottom part 11. But, as shown in FIG. 12 to FIG. 14, the slit 32 to 35 may be partially formed on the base bottom part 11 in a manner that the slit 32 to 35 does not break off the seal bead 30.

Figure 12:
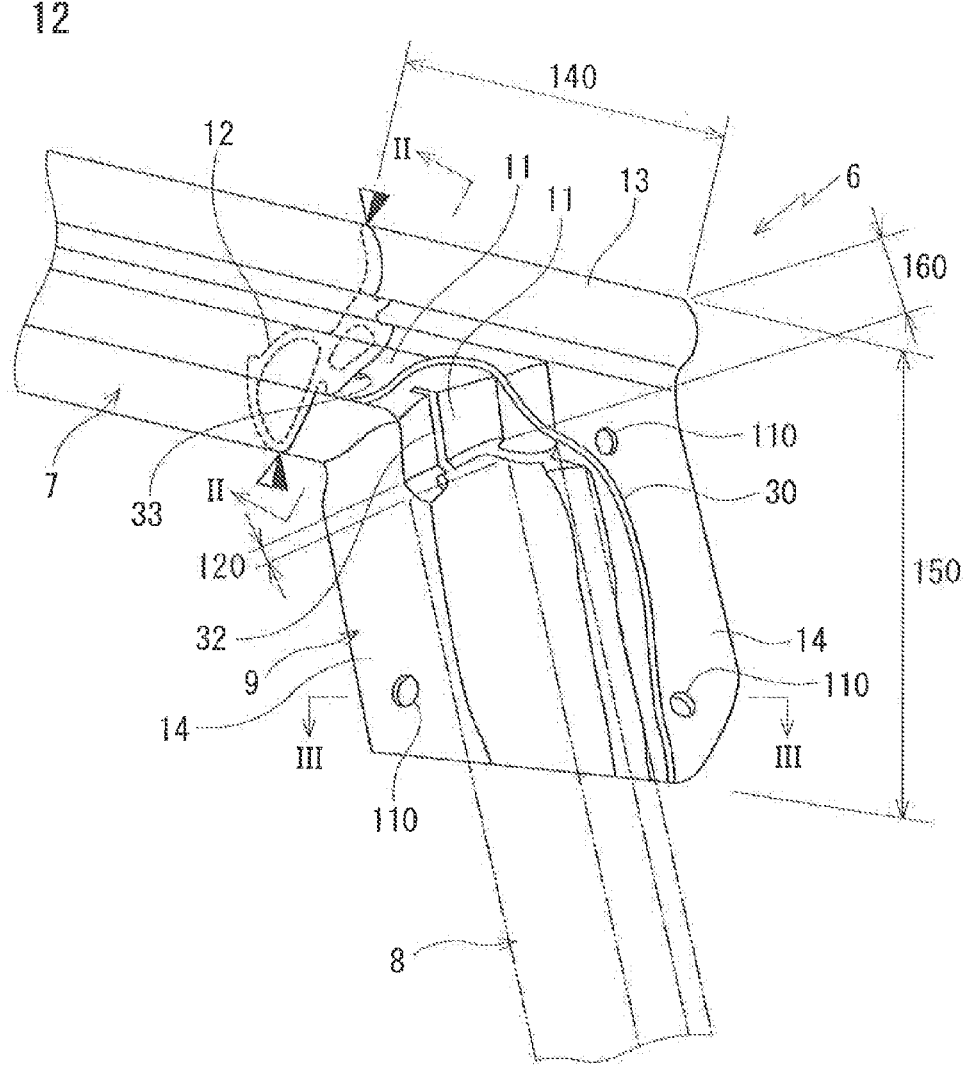
FIG. 12 is an enlarged perspective view of a part 130 of FIG. 8 of another door weather strip according to the embodiment of the present invention.

In FIG. 12, the slit 32 having a substantially L shape is provided, of which one side extends on a whole of a surface extending from the corner of the base bottom part 11 of the molded part 9 toward the lower extrusion molded part 8 side and another side extends from the corner toward the upper extrusion molded part 7 side a little. The slit 32 is used for pulling out the core. In addition, a short slit 33 is provided on the molded part 9 side of a connecting position between the molded part 9 and the upper extrusion molded part 7. The slit 33 is used for positioning the upper extrusion molded part 7 relative to the molded part 9 at the time of abutting. The slit 33 may be omitted.

The seal bead 30 extends from the inner-cabin side toward the outer-cabin side of the base bottom part 11 in a manner to cross a space between the slit 32 and the slit 33.

Figure 13:
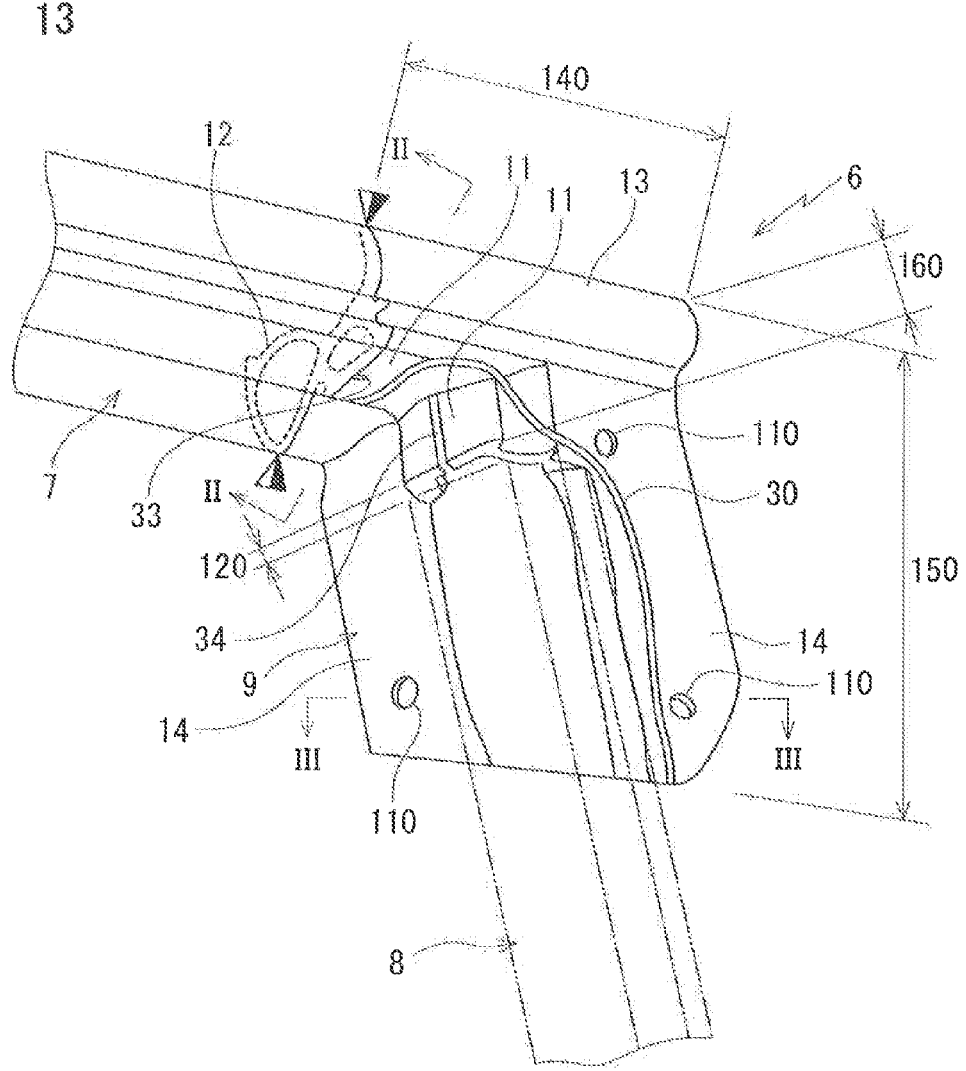
FIG. 13 is an enlarged perspective view of a part 130 of FIG. 8 of another door weather strip according to the embodiment of the present invention.
Figure 14:
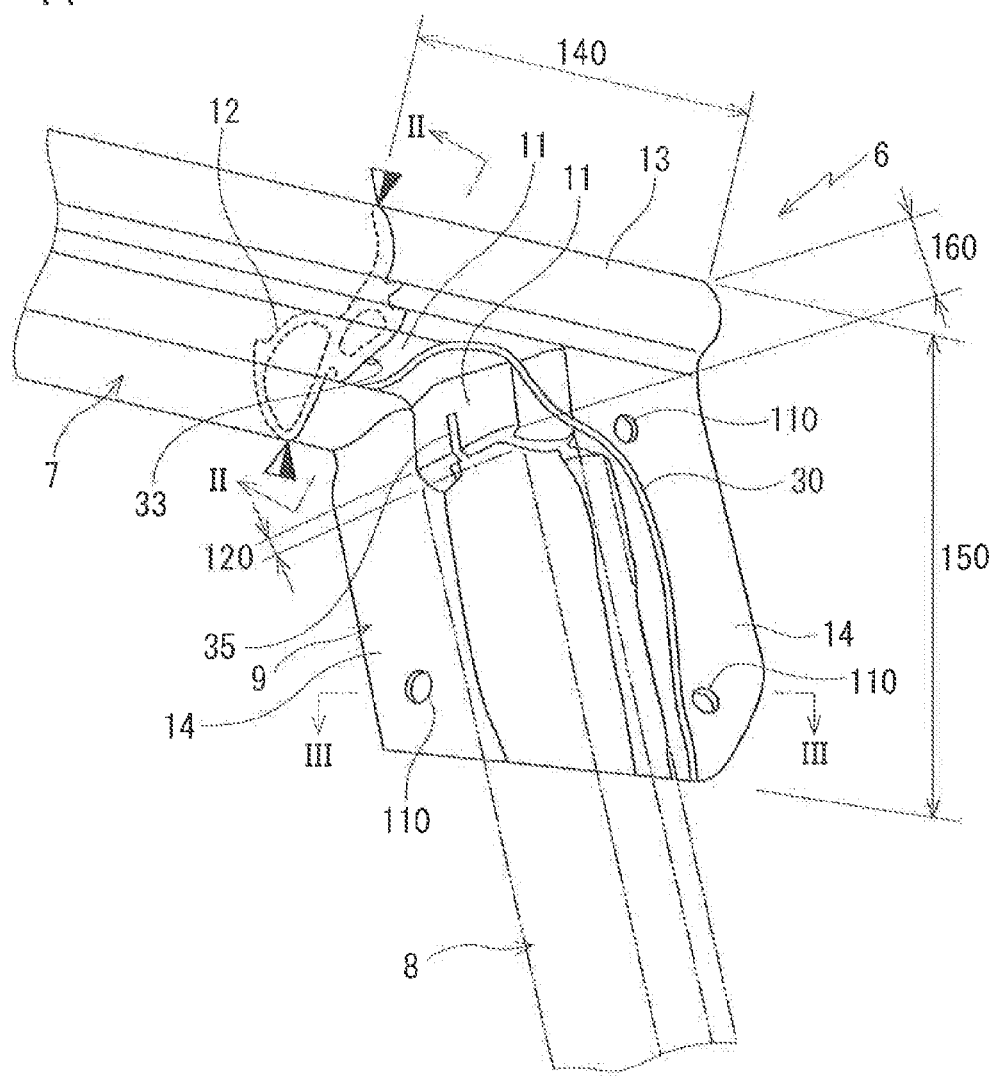
FIG. 14 is an enlarged perspective view of a part 130 of FIG. 8 of another door weather strip according to the embodiment of the present invention.

In FIG. 13, a slit 34 which is substantially linear and used for pulling out the core is provided only on the whole of the surface extending from the corner of the base bottom part 11 of the molded part 9 toward the lower extrusion molded part 8 side. In the same manner as FIG. 12, the short slit 33 is provided for positioning but the slit 33 may be omitted.

The seal bead 30 extends from the inner-cabin side toward the outer-cabin side of the base bottom part 11 in the manner to cross the space between the slit 34 and the slit 33.

In FIG. 14, a slit 35 used for pulling out the core is substantially half in length in a lengthwise direction of the base bottom part 11 of the molded part 9. The slit 35 is substantially linear and is provided only on a lower side of a substantially half (substantially intermediate) position in the lengthwise direction. In the same manner as FIG. 12, the short slit 33 is provided for positioning but the slit 33 may be omitted.

The seal bead 30 extends from the inner-cabin side toward the outer-cabin side of the base bottom part 11 in the manner to cross the space between the slit 35 and the slit 33.

In the present embodiment, the seal bead 30 is integrally molded with the molded part 9 continuously but a lip may be integrally molded with the molded part 9 continuously instead of the seal bead 30.

As the door weather strip 6 is installed on the door 1 and the molded part 9 is installed by the clip 16, the seal bead 30 or the lip is on a position near the clip hole 110 or the clip 16, which is on the inner circumferential side. Accordingly, the seal bead 30 or the lip strongly abuts the door panel, thereby performing an excellent sealing property.

While the present embodiment employs the clip 16, double-faced adhesive tape may be employed instead of the clip 16. In this case, a plurality of short tapes may be partially adhered on positions corresponding to the clip holes 110 or the tape may also be continuously adhered on intervals between the clip holes 110.

Figure 6:
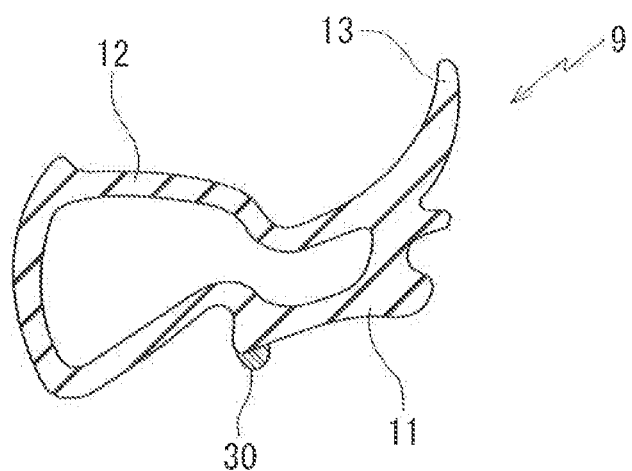
FIG. 6 is IV-IV line enlarged cross section of FIG. 2, showing another door weather strip according to an embodiment of the present invention.
Figure 7:
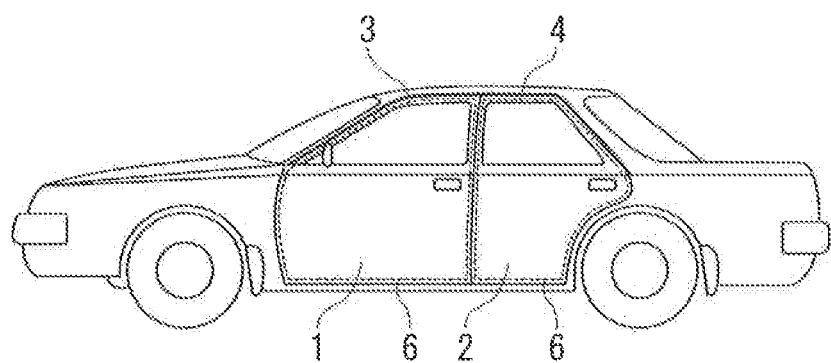
FIG. 7 is a side view of an automobile.

In the present embodiment, the bridge 31 is provided between the hollow seal member 12 and the base bottom part 11 of molded part 9 which has the same cross sectional shape as the upper extrusion molded part 7 for preventing deformation of the hollow seal member 12 at the time of elastic contact. But the bridge 31 may be omitted as shown in FIG. 6. Even in case the bridge 31 is omitted, deformation of the hollow seal member 12 is prevented as compared with the prior art because base bottom part 11 does not comprise a space by the slit as in the prior art.

Figure 15:
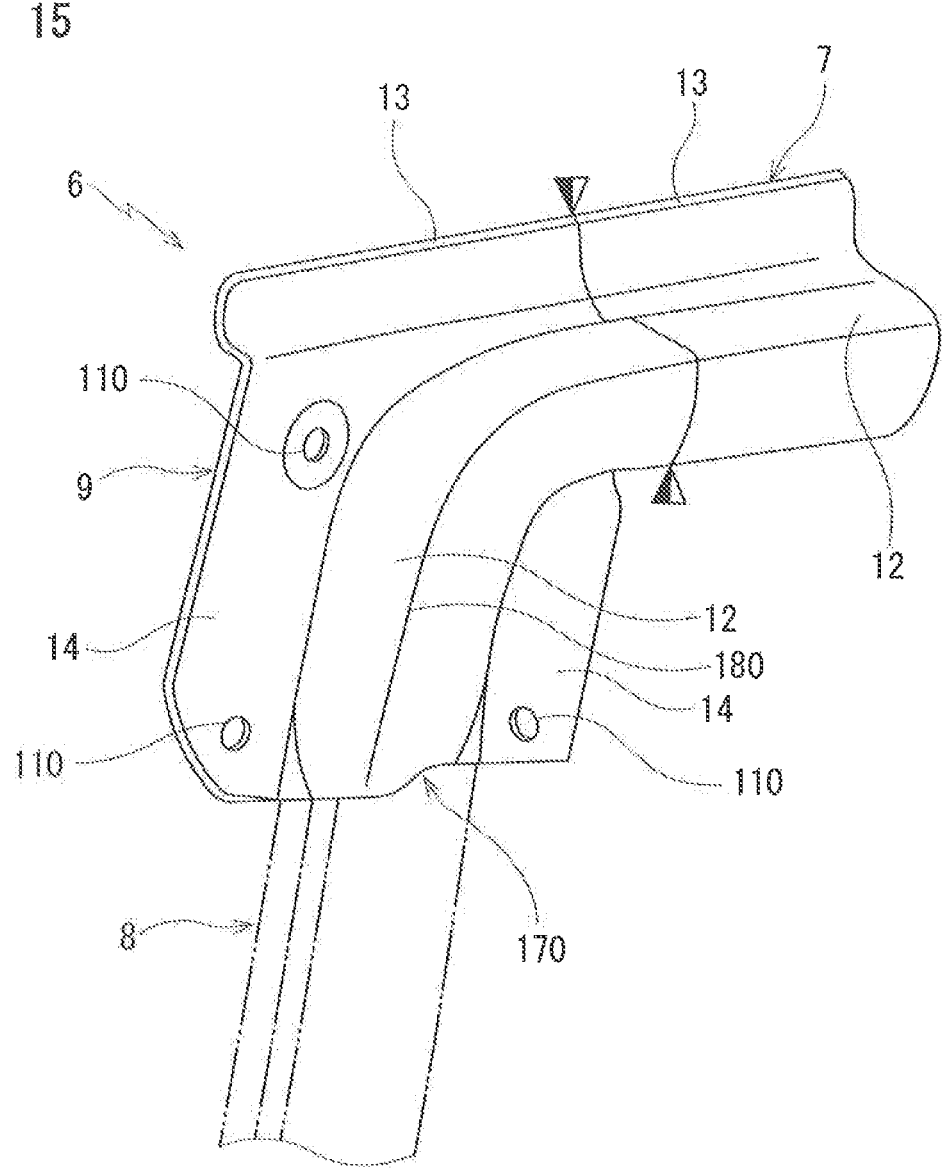
FIG. 15 is an enlarged perspective view of the part 130 of FIG. 8 of another door weather strip according to the embodiment of the present invention, seen from a same angle as FIG. 3.

In addition, as shown in FIG. 15, difference in level 170 on the lower end of the hollow seal member 12 of the molded part 9 prevents entrance of water toward the inner-cabin side along the surface of the hollow seal member 12. The difference in level 170 crosses a ridge line 180 of the hollow seal member 12. An outer-cabin side relative to the ridge line 180 protrudes toward a lower direction compared with an inner-cabin side, thereby forming the difference in level 170 and varying a shape. As a result, water which falls down along the surface of the hollow seal member 12 is guided to the difference in level 170 and drained outside the automobile.

The door weather strip 6 according to the present embodiment is installed on the front door 1 side but may also be installed on a rear door 2 side.

I claim:

1. A door weather strip comprising: an upper extrusion molded part installed along an upper part of a door sash or a door panel on a roof side of an automobile; a molded part connected to an end of the upper extrusion molded part on a door corner part; and a lower extrusion molded part installed along a vertical part of the door sash or the door panel, an upper end of the lower extrusion molded part being detachably inserted into the molded part; said upper extrusion molded part, said molded part and said lower extrusion molded part having a base bottom part and a hollow seal member formed thereon, the hollow seal member being integrally molded with the base bottom part and making elastic contact with a door opening circumferential edge on a body side when a door is closed, wherein:
   a seal bead or a lip is integrally molded with the molded part without being broken off because of a slit for pulling out a core for molding, said seal bead or said lip protruding downwardly in a direction substantially parallel to a longitudinal direction of the lower extrusion molded part, from the base bottom part of said molded part on said roof side, said seal bead or said lip diagonally extending relative to the longitudinal direction of the lower extrusion molded part in a direction toward the lower extrusion molded part, said seal bead or said lip continuously extending from an inner-cabin side toward an outer-cabin side and descending along the outer-cabin side on a part of said molded part on a side of the vertical part of said door sash or said door panel.

2. The door weather strip as claimed in claim 1, wherein: in the part of said molded part on the vertical part of said door sash or said door panel, said seal bead or said lip is on an outer circumferential side of the molded part; and said seal bead or said lip continuously extends to a lower end of said molded part.

3. The door weather strip as claimed in claim 2, wherein: said slit is provided on a surface extending from a corner of the base bottom part of said molded part toward said lower extrusion molded part.

4. The door weather strip as claimed in claim 3, wherein: a length from a corner of said molded part to an edge of a lower extrusion molded part side of said molded part is longer than a length from said corner to an edge of an upper extrusion molded part side of said molded part.

5. The door weather strip as claimed in claim 4, wherein: a bridge is provided between the hollow seal member and the base bottom part of said molded part.

6. The door weather strip as claimed in claim 2, wherein: said slit is provided only on a surface extending from a corner of the base bottom part of said molded part toward said lower extrusion molded part.

7. The door weather strip as claimed in claim 6, wherein: a length from a corner of said molded part to an edge of a lower extrusion molded part side of said molded part is longer than a length from said corner to an edge of an upper extrusion molded part side of said molded part.

8. The door weather strip as claimed in claim 7, wherein: a bridge is provided between the hollow seal member and the base bottom part of said molded part.

9. The door weather strip as claimed in claim 2, wherein: said slit for pulling out the core for molding is not provided on said molded part.

10. The door weather strip as claimed in claim 9, wherein: a length from a corner of said molded part to an edge of a lower extrusion molded part side of said molded part is longer than a length from said corner to an edge of an upper extrusion molded part side of said molded part.

11. The door weather strip as claimed in claim 10, wherein: a bridge is provided between the hollow seal member and the base bottom part of said molded part.

12. The door weather strip as claimed in claim 2, wherein: a length from a corner of said molded part to an edge of a lower extrusion molded part side of said molded part is longer than a length from said corner to an edge of an upper extrusion molded part side of said molded part.

13. The door weather strip as claimed in claim 1, wherein: said slit is provided on a surface extending from a corner of the base bottom part of said molded part toward said lower extrusion molded part.

14. The door weather strip as claimed in claim 1, wherein: said slit is provided only on a surface extending from a corner of the base bottom part of said molded part toward said lower extrusion molded part.

15. The door weather strip as claimed in claim 1, wherein: said slit for pulling out the core for molding is not provided on said molded part.

16. The door weather strip as claimed in claim 1, wherein: a length from a corner of said molded part to an edge of a lower extrusion molded part side of said molded part is longer than a length from said corner to an edge of an upper extrusion molded part side of said molded part.

\* \* \* \* \*